Sept. 9, 1941.  H. C. HILL  2,255,217
PISTON PIN RETAINER
Filed Feb. 2, 1939
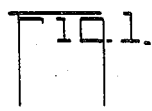
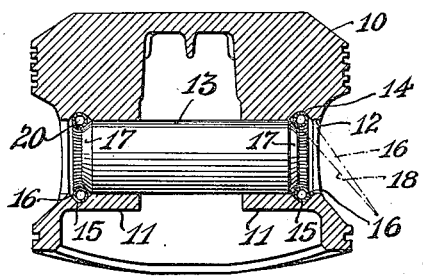
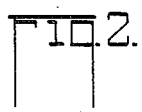
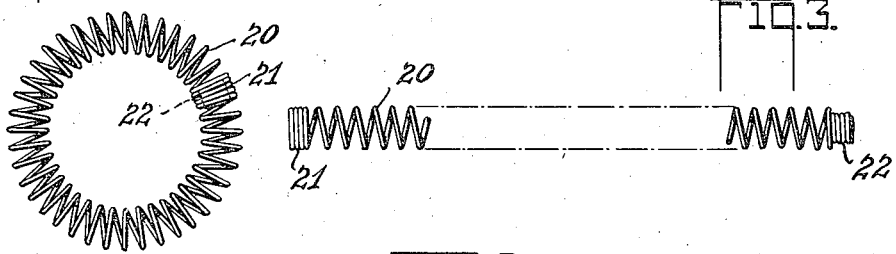
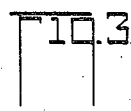
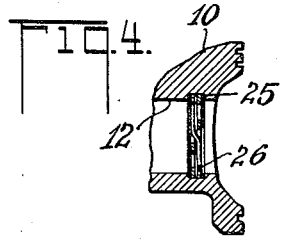
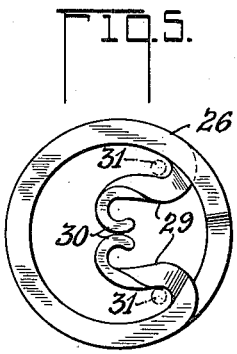
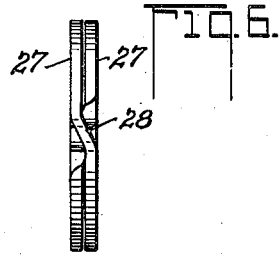
INVENTOR
HENRY C. HILL
BY
ATTORNEY Patented Sept. 9, 1941

2,255,217

UNITED STATES PATENT OFFICE 2,255,217

PISTON PIN RETAINER

Henry C. Hill, Montclair, N. J., assignor to Wright Aeronautical Corporation, a corporation of New York Application February 2, 1939, Serial No. 254,144

8 Claims. (Cl. 85—8.5)

This invention relates to internal combustion engines primarily, and is particularly concerned with the provision of a novel form of locking device for axially locating floating piston pins in pistons.

An object of the invention is to provide a resilient locking device for axially locating a piston pin which shall be readily insertable and removable upon assembly of the piston, and which shall have improved functioning in service. A further object is to provide a pin lock, in conjunction with a special groove in the piston, which can not readily be displaced in operation and which shall have sufficient resilience to resist tendencies toward fracture which have been common to conventional pin locks of the prior art. Still another object is to provide a pin lock which is extremely easy to manufacture, which can be made from conventional materials and shall be low in cost.

Particularly in aircraft engines, floating piston pins are used which are free to rotate both in the piston and in a bushing in the end of a connecting rod. It has been conventional to axially locate the piston pins by the insertion of spring rings in grooves near the ends of the piston pin bosses. These spring rings for reasons which are somewhat obscure have been subject to failure and upon such failure the piston pin moves axially and may scar the cylinder wall. Although the lock rings have been made of excellent materials, the problem has not been cured. By the present invention, two embodiments of which are shown, failures have been eliminated and this troublesome problem appears to have been solved.

The details of the invention will be readily understood by reading the annexed description in connection with the drawing, in which Fig. 1 is a section through an aircraft engine piston embodying a floating piston pin and the locking rings of the invention;

Fig. 2 is an elevation of one form of locking ring;

Fig. 3 is an elevation of the lock ring when developed;

Fig. 4 is a fragmentary section through a piston showing an alternative form of lock ring;

Fig. 5 is an enlarged elevation of the alternative lock ring; and

Fig. 6 is an end view of the ring.

In Figs. 1, 2 and 3, 10 indicates a piston having pin bosses 11 bored as at 12 to receive a piston pin 13. In the bores 12 and toward the ends thereof, annular grooves 14 are cut, the profile of the grooves comprising a segmental portion 15 and tangents 16 intersecting the surface of the bore. The piston pin 13 is formed with chamfered ends 17, the taper of the chamfer being such that a conical element thereof, such as 18, makes a smaller angle with the pin axis than does the tangent 16 of the lock ring groove. After assembly of the pin in the piston, locking rings 20 are snapped into the grooves 14, these rings 20 each comprising a helical spring bent into an annulus. One end of each helical spring is formed with tight coils 21 of full spring diameter while the other end is formed with tight coils 22 of reduced external diameter which are adapted to engage within the tight coils 21 whereby the locking ring 20 comprises an element which may be readily handled without separation of the ends.

A particular feature of the ring or circlet 20 lies in the fact that it is wound so that adjacent turns are spaced apart whereby the free diameter of the circlet is greater than the diameter of the groove 14 in the piston. Also, the wire size and number of turns in the spring is so chosen that when the circlet is compressed to the point where adjacent turns of wire touch each other—that is, when the spring is bottomed— the external diameter of the circlet is less than the diameter of the groove 14 but is greater than the diameter of the pin bore 12. This means that the circlet when inserted cannot be displaced from the groove by axial movement of the piston pin acting throughout the circlet periphery, yet the circlet can be readily removed from the piston by catching one or two turns of the spring in a buttonhook-like tool which when withdrawn removes the spring progressively from the groove. Assembly of the ring in the piston groove is accomplished by ovalizing the circlet, inserting it in the pin bore on a slant, engaging part of the circlet in the groove and in then working the balance of the circlet into the groove until the whole thereof is engaged.

The relationship of the lines 16 and 18 of Fig. 1 is such that once the spring ring 20 is assembled in the piston, inadvertent displacement is impossible due to any small axial movement of the piston ring 13, since the chamber 17 on the piston ring will tend to jam the spring ring into its groove. The spring ring 20, due to the spring coils thereof, is slightly resilient against axial movement of the piston pin and the whole ring 20 is readily insertable or removable, removal being accomplished by the use of a small steel hook like a buttonhook, by which the ring may be withdrawn from the piston.

Figs. 4, 5 and 6 show an alternative form of a readily removable pin lock which, however, may not have as good properties for absorbing shock upon axial movement of the piston pin. The lock ring groove as shown in Fig. 4 is rectangular as indicated at 25 and within this groove a two turn helical spring ring 26 is insertable. This ring 26 in some respects resembles a conventional key ring since it embodies coils 27 joined by an integral offset piece 28 so that the end faces of the coils 27 are plane and parallel. The free ends of the coils 27 are formed as inward circumferentially spaced projections 29, the ends of which, as at 30 are bent back upon themselves to form mutually contacting abutment faces, the contact of which is substantially central relative to the ring 26. The purpose of this hook arrangement is to permit of easy assembly and disassembly of the spring ring in the piston. A pair of round nose pliers serve as a tool for handling the spring ring, the plier noses being indicated at 31. Upon closing of the pliers, the ends of the coils 27 are drawn toward one another and the bridge element 28 is maintained concentric therewith as the parts 29 of the ring are drawn toward one another by plier action, due to the abutment of the parts 30. Without the contacting parts 30, the end portions of the coils 27 would be drawn substantially radially inwardly from the ring profile, whereupon its diameter would not be reduced sufficiently to allow of insertion into the piston pin bore. It is contemplated that the ring 26 be fabricated from spring steel, such material also being used for the ring 20 of the first embodiment. However, the ring 20 is cheaply fabricated under conventional coil spring practice, while the ring 26 would necessarily be fabricated by forging operations.

Particular advantages flow from the use of both rings disclosed as follows:

(1) Bearing throughout the circumference of the pin and bore groove is provided, as distinct from prior practice in which the bearing was only about half the circumference due to the lock ring taper required for flexibility.

(2) The types shown give great radial flexibility, permitting adequate distortion for assembly purposes without stressing the lock ring beyond its elastic limit. In previous types, the ring often was given a permanent set due to assembly stress, spoiling its elastic properties and fit allowing lock ring movement and fatigue due to hammering by the piston pin.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. As an article of manufacture, a piston pin retainer comprising a helical spring having its central turns space-wound and having its end turns contact wound, the turns at one end having an outside diameter substantially the same as the outside diameter of the central turns and the turns at the other end having an outside diameter substantially equal to the inside diameter of the turns at said first end.

2. A pin retainer for use in a piston having a pin receiving bore and having an annular groove, comprising a compressible helical spring space wound intermediate its ends and bent into a circlet, the spring ends being secured to one another, the pitch of the helix turns being so chosen that the spring turns when in contact with one another cause an external circlet diameter greater than the piston bore and less than the diameter of the annular groove.

3. A piston pin lock ring for engagement within a piston bore having a groove, comprising a compressible helical spring space wound except at its ends and bent into a circlet, the spring ends being secured to one another, the free diameter of the circlet being greater than the greatest diameter of the piston bore groove.

4. A piston pin lock ring for engagement within a piston bore having a groove, comprising a compressible, predominantly space wound helical spring bent into a circlet, the free diameter of the circlet being greater than the greatest diameter of the piston bore groove, and the diameter of the circlet, when compressed to the point where adjacent turns are in contact, being greater than the bore diameter.

5. A piston pin lock ring for engagement within a piston bore having a groove, comprising a compressible, predominantly space wound helical spring bent into a circlet, the free diameter of the circlet being greater than the greatest diameter of the piston bore groove, and the diameter of the circlet, when compressed to the point where adjacent turns are in contact, being greater than the bore diameter, whereby the circlet is inserted into said groove by inserting first one portion of the circlet periphery into the groove and then working the balance of the circlet into groove engagement.

6. A radially compressible circlet for use as a piston pin retainer comprising a centrally space-wound spring wire helix the turns at both ends being substantially contact wound and the turns at one end being wound to a smaller diameter than those at the opposite end whereby said smaller diameter end is insertable into the other end upon which the helix is formed into a circlet.

7. A radially compressible spring ring for use as a piston pin retainer comprising a space-wound spring wire helix bent into annular form, the ends of the helix being formed respectively to relatively large and small diameters for interfitting sleeving engagement.

8. A radially compressible spring ring for use as a piston pin retainer comprising a space-wound spring wire helix bent into annular form, the ends of the helix being engaged with one another in interfitting relation.

HENRY C. HILL.